United States Patent
Hick et al.

(10) Patent No.: US 8,312,347 B2
(45) Date of Patent: Nov. 13, 2012

(54) LIGHTING CONTROL PROTOCOL

(75) Inventors: Robert Hick, Newberg, OR (US); Edward J. Carr, Lake Oswego, OR (US); Richard A. Leinen, Wilsonville, OR (US); Paul S. Maddox, Tualatin, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 1207 days.

(21) Appl. No.: 12/108,184

(22) Filed: Apr. 23, 2008

(65) Prior Publication Data
US 2008/0276154 A1 Nov. 6, 2008

Related U.S. Application Data

(60) Provisional application No. 60/916,185, filed on May 4, 2007.

(51) Int. Cl.
*H03M 13/00* (2006.01)
(52) U.S. Cl. .................... 714/758; 340/12.32
(58) Field of Classification Search .............. 714/749, 714/758; 340/12.32
See application file for complete search history.

(56) References Cited

U.S. PATENT DOCUMENTS

| | | | |
|---|---|---|---|
| 4,273,961 A * | 6/1981 | Blank et al. | 379/40 |
| 5,553,083 A * | 9/1996 | Miller | 714/748 |
| 5,838,226 A * | 11/1998 | Houggy et al. | 340/12.32 |
| 6,507,158 B1 * | 1/2003 | Wang | 315/294 |
| 6,762,570 B1 | 7/2004 | Fosler | |
| 6,771,029 B2 | 8/2004 | Ribarich et al. | |
| 6,831,569 B2 | 12/2004 | Wang et al. | |
| 6,845,274 B2 * | 1/2005 | Wang | 700/23 |
| 6,859,644 B2 | 2/2005 | Wang | |
| 7,265,503 B2 | 9/2007 | Green | |
| 2002/0099451 A1 * | 7/2002 | Wang | 700/4 |
| 2002/0158591 A1 | 10/2002 | Ribarich et al. | |
| 2003/0020595 A1 | 1/2003 | Wacyk | |
| 2003/0036807 A1 * | 2/2003 | Fosler | 700/3 |
| 2004/0015570 A1 * | 1/2004 | Daum et al. | 709/220 |
| 2004/0140777 A1 | 7/2004 | Fosler | |
| 2004/0225811 A1 * | 11/2004 | Fosler | 710/305 |
| 2005/0105662 A1 * | 5/2005 | Margules | 375/376 |
| 2006/0125426 A1 | 6/2006 | Veskovic et al. | |
| 2006/0126617 A1 * | 6/2006 | Cregg et al. | 370/389 |
| 2006/0193133 A1 | 8/2006 | Von Der Brelie | |
| 2006/0273741 A1 | 12/2006 | Stalker, III | |

(Continued)

OTHER PUBLICATIONS

"Add Control, Memory, Security, and Mixed-Signal Functions with a Single Contact", <http://www.maxim-ic.com/an3989>, Jan. 25, 2007, Application note 3989, Maxim Integrated Products, (3 pages).

(Continued)

*Primary Examiner* — Joshua Lohn
(74) *Attorney, Agent, or Firm* — Marger Johnson & McCollom PC (57) ABSTRACT

A digital lighting control network protocol with forward and backward frames, each of the frames including an error check code. A no-acknowledgment (NAK) signal is sent from a receiving node to a transmitting node responsive to the error check code. An interface circuit of the receiving node may include an energy storage section to store at least some energy from the network while receiving digital signals, and an output section to transmit digital signals to the network using the stored energy. The interface circuit may also include a high voltage buffer circuit. The transmitting node may send forward frames to receiving nodes based on device type.

14 Claims, 10 Drawing Sheets

U.S. PATENT DOCUMENTS

2007/0018783 A1    1/2007    Erhardt

OTHER PUBLICATIONS

"1-Wire® Extended Network Standard", <http://www.maxim-ic.com/an3925>, Oct. 26, 2006, Application note 3925, Maxim Integrated Products, (5 pages).

"1-Wire® Design Guide", <http://www.maxim-ic.com/design_guides/en/1_WIRE_PRODUCTS_4.pdf>, 2005, (7 pages).

"Digital Addressable Lighting Interface (DALI) Control Devices Protocol", Oct. 12, 2005, NEMA Standards Publication 243-2005, Version 1.19, National Electrical Manufacturers Association, Rosslyn, VA, USA, (123 pages).

EcoSystem™ technical guide, Lutron® Electronics Co., Inc., Mar. 2006, USA, (31 pages).

ECS™: Addressable Lighting Control and Energy Management System, Encelium: Lighting Control for the Smart Building, <www.encelium.com/products/software.html>, (32 pages).

Fosler, "Digitally Addressable DALI Dimming Ballast", Microchip® Technology Inc., 2002, AN809, DS00809B, (18 pages).

"The ABC's of DALI" brochure, Advance Transformer Co., <http://www.advancetransformer.com/uploads/resources/CO-7110-R01_ABCofDALI.pdf>, 2003, (24 pages).

Bosch, Robert GmbH, "CAN Specification", BOSCH, Sep. 1991, Version 2.0, Postfach 30 02 40, D-70442 Stuttgart, (73 pages).

Patent Cooperation Treaty Written Opinion of the International Searching Authority, Oct. 22, 2008, PCT/US2008/062703, 6 pages.

Patent Cooperation Treaty International Search Report, Oct. 22, 2008, PCT/US2008/062703, 3 pages.

The Electric Century, "IEC 62386-101: Digital Addressable Lighting Interface—Part 101: General Requirements; System," IEC, New Work Item Proposal 34C/737/NP, Apr. 2006, 13 pages.

The Electric Century, "IEC 62386-102: Digital Addressable Lighting Interface—Part 102: General Requirements; Control Gear," IEC, New Work Item Proposal 34C/738/NP, Apr. 2006, 128 pages.

\* cited by examiner

LIGHTING CONTROL PROTOCOL

CLAIM OF PRIORITY

This application claims priority from U.S. Provisional Patent Application Ser. No. 60/916,185 entitled "Lighting Control Protocol" filed May 4, 2007, which is incorporated by reference.

FIELD

The invention relates to lighting control. More specifically, the invention relates to data communication protocols for controlling lighting fixtures and associated devices.

BACKGROUND

Digital Addressable Lighting Interface (DALI), also known as IEC 60929, Appendix E, is an industry standard digital lighting control protocol that enables flexible control of multiple lighting fixtures from a central controller.

Figure 1:
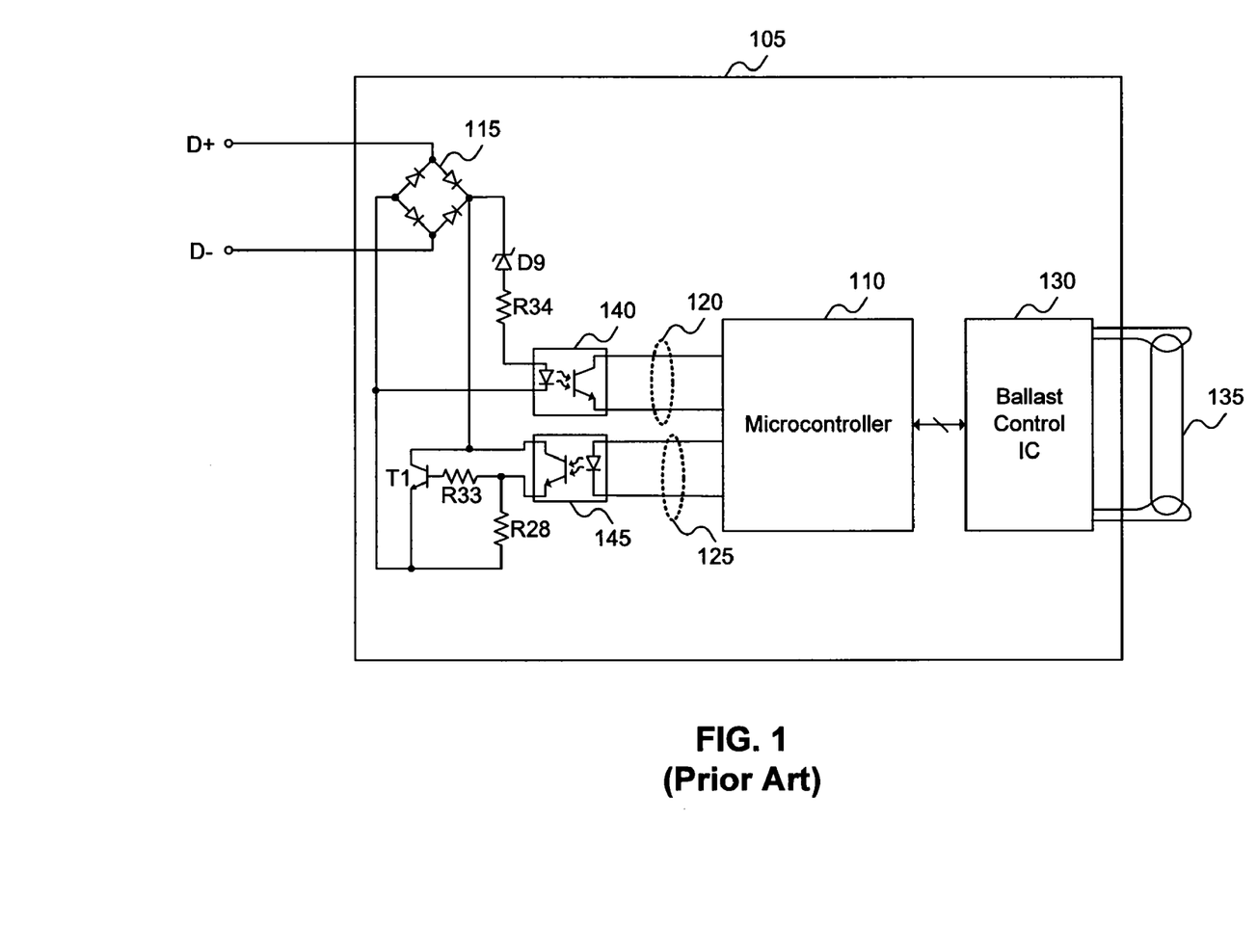
FIG. 1 illustrates a prior art circuit of a ballast including a DALI interface circuit for transmitting and receiving signals between a DALI network and a microcontroller.

FIG. 1 illustrates a prior art circuit of a ballast 105 including a DALI interface circuit for transmitting and receiving signals between a DALI network and a microcontroller 110. Digital data conforming to the DALI protocol is transmitted over lines D+ and D− through a bridge rectifier 115. The digital data received from the DALI network is converted into digital signals 120 and 125 and transmitted and received to and from the microcontroller 110.

The microcontroller 110 controls the ballast control IC 130 by sending signals to perform actions such as, for example, to dim a lamp 135 or to turn on or off the ballast control IC 130. The microcontroller 110 receives signals from the ballast control IC 130 such as, for example, lamp fault detection purposes. The ballast control IC 130 determines whether the lamp 135 should be on or off based on fault conditions exhibited by the lamp 135. The circuit of ballast 105 includes two 4-pin optocouplers 140 and 145 to optically isolate the microcontroller 110 from the digital data received from the DALI network.

The conventional DALI interface circuit includes a zener diode D9 and a resistor R34 coupled between the rectifier 115 and the optocoupler 140 on the receive side. The conventional DALI interface circuit also includes a bipolar junction transistor (BJT) T1, resistor R33, and resistor R28 coupled to the rectifier 115 and the optocoupler 145 on the transmit side.

Figure 2:
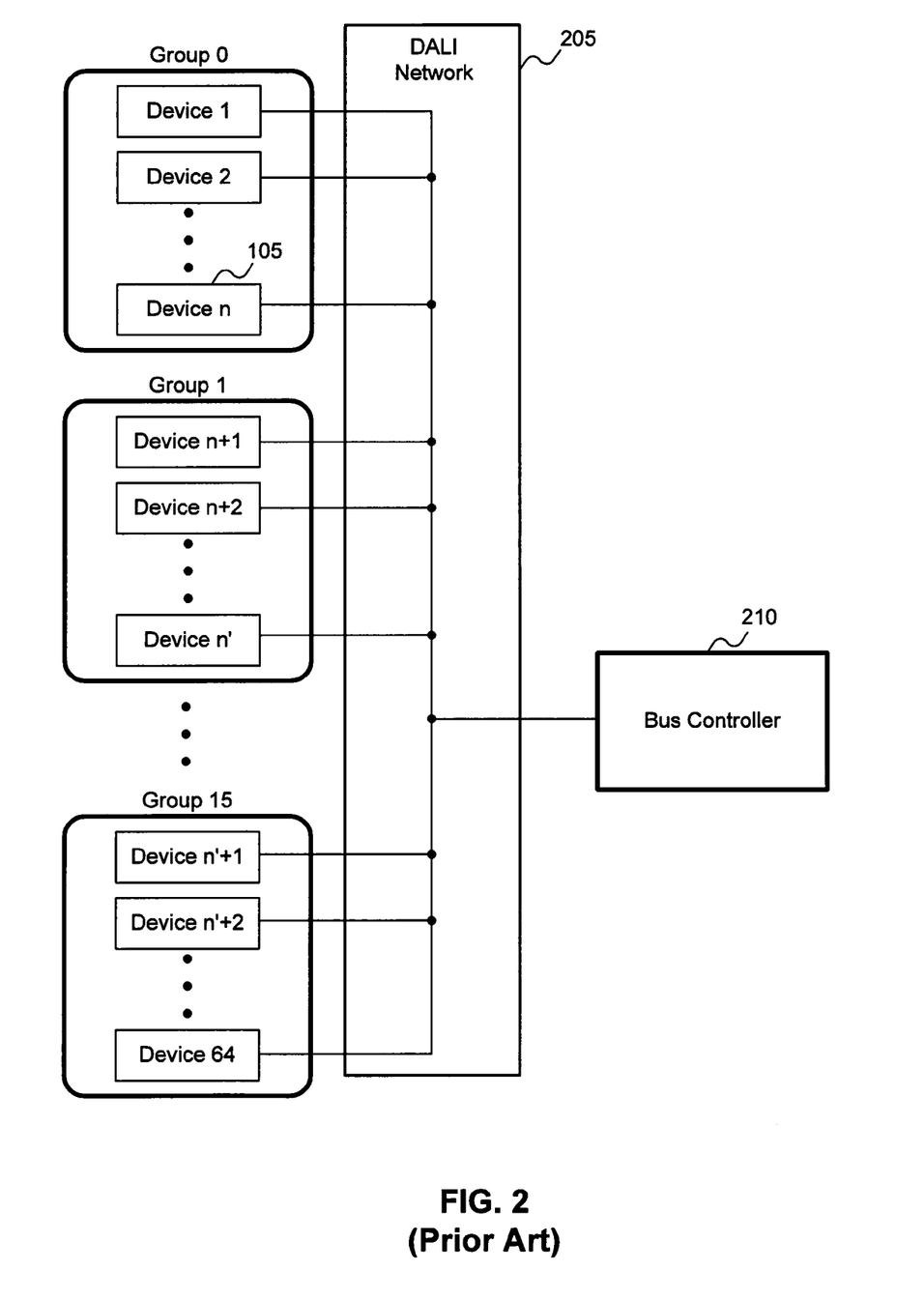
FIG. 2 illustrates a conventional DALI network including 64 ballasts arranged in 16 different groups.

FIG. 2 illustrates a conventional DALI network 205, which can include up to 64 ballasts (e.g., 105) arranged in up to 16 different groups (e.g., Groups 0-15). For simplicity, the network connections of the DALI network 205 are shown as single lines. However, it will be appreciated by those with skill in the art that the devices can be individually or collectively controlled through a two-wire communication interface. The bus controller 210 communicates with a single device (e.g., 105) or a group of devices (e.g., Group 1).

A conventional DALI network transmits forward and backward frames (not shown), each forward frame including an address byte. The address byte includes 8 bits, for example, YAAA AAAS or Y00G GGGS. When bit Y is a zero, address bits AAAAAA are used to address up to 64 individual ballasts (e.g., 105). When bit Y is a one, a group address or broadcast address may be indicated. For example, a group address is indicated by 100G GGGS. Group bits GGGG are used to address up to 16 groups (e.g., Groups 0-15). And bit S corresponds to a packet selector bit. For example, when bit S is a zero, a data byte XXXX XXXX following the address byte indicates a direct dimmer power level. When bit S is a one, the data byte following the address byte indicates a command. Conventional DALI characteristics include a transmission rate (baud rate) of 1200 bps, signal voltages between 9.5 and 22.5 volts (V), and signal currents of up to 250 milliamps (mA).

Although the DALI standard has proven to be a successful standard, its technical details limit its effectiveness in ever more demanding installations. Its slow transmission speed can cause visible delays in large installations. And the DALI protocol fails to provide a way to detect transmission errors or to transmit frames to groups based on device type. Accordingly, a need exists for an improved interface circuit and method for signaling on a digital lighting control network.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

This patent disclosure encompasses numerous inventions relating to a digital lighting control network. For convenience, the various inventions disclosed in this application are sometimes referred to collectively or individually as "the present invention." It will be understood, however, that these inventions have independent utility and are independently patentable. In some cases, additional benefits are realized when some of the principles are utilized in various combinations with one another, thus giving rise to yet more patentable inventions.

These principles may be realized in numerous different embodiments. Although some specific details are shown for purposes of illustrating the preferred embodiments, other effective arrangements can be devised in accordance with the inventive principles of this patent. Thus, the inventive principles are not limited to the specific details disclosed herein.

Figure 3:
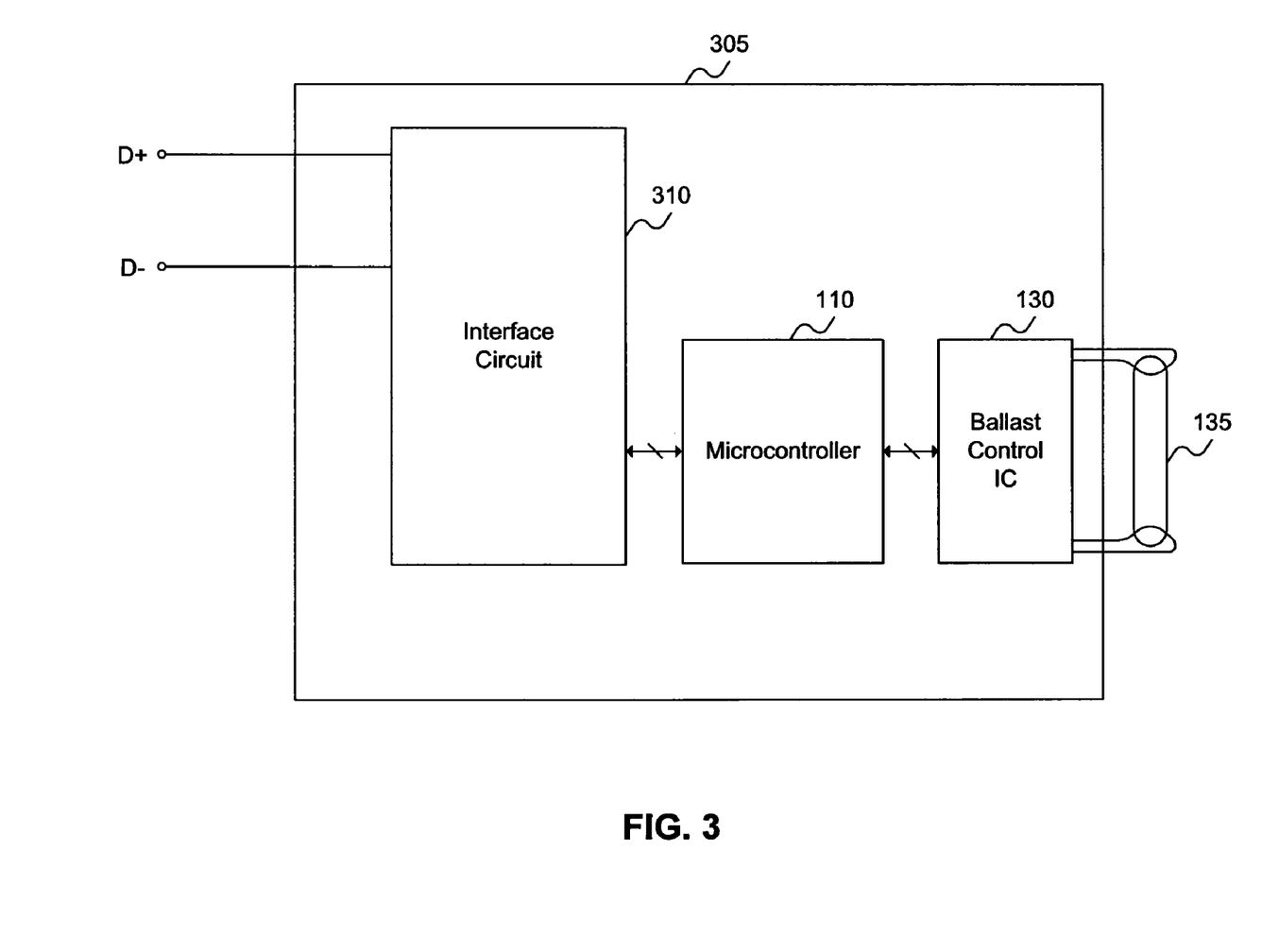
FIG. 3 illustrates an embodiment of device including an interface circuit, a microcontroller, a ballast control integrated circuit (IC), and a lamp, according to some of the inventive principles of this patent disclosure.

FIG. 3 illustrates an embodiment of device 305 including an interface circuit 310, the microcontroller 110, the ballast control integrated circuit (IC) 130, and the lamp 135, according to some of the inventive principles of this patent disclosure. Specifically, the interface circuit 310 may implement a transmission rate (baud rate) significantly faster than the conventional 1200 bps specified in the DALI protocol, for example, 4800 bps. This enables substantially higher throughput than prior art standards. The interface circuit 310 may also support a data bus operating voltage and/or current that is substantially greater than the conventional 9.5-22.5 V and 250 mA specified by DALI. For example, the use of a 40 V, 500 mA power supply enables a substantially longer transmission range and also provides a more robust network.

The interface circuit 310 may include the ability to detect whether the device 305 is coupled to conventional DALI network running at the lower transmission rate or to an extended DALI network running at the higher transmission rate. Upon detection of the extended DALI network, the device 305 may operate using extended commands or addresses sometimes referred to as SectorNet™ extensions, as further described below. Also, the device 305 may selectively operate at either (a) the slower 1200 bps transmission rate and lower 9.5-22.5 V and 250 mA operating characteristics when coupled to a conventional DALI network, or (b) the faster 4800 bps and higher 40 V, 500 mA operating characteristics when coupled to an extended DALI or SectorNet™ network. To maintain electrical backwards-compatibility, signaling voltages of 0V±6.5V may be considered logical zero, while signaling voltages of 16V−6.5V/+26V (i.e., 9.5V to 42V) may be considered logical one. Stated alternately, a threshold voltage of about 8.0V may be used to distinguish logical zeros from logical ones. Preferably, systems will operate to establish a minimum 3V difference between "zero" signal levels and "one" signal levels. Persons with skill in the art will recognize that the device 305 could detect two or more transmission rates or other operating characteristics and adaptively adjust to conform to the specific network requirements to which it is coupled.

In some embodiments, the device 305 may be a ballast. However, persons with skill in the art will recognize that the interface circuit 310 may be used with other types of devices such as an occupancy sensor, a light sensor (e.g., a photocell), a switch, an infrared sensor, or a lamp, among other possibilities. In general, device 305 may be any sort of electrically-operated device or electrical load. The device 305 will be discussed more fully with respect to various embodiments described below.

Figure 4:
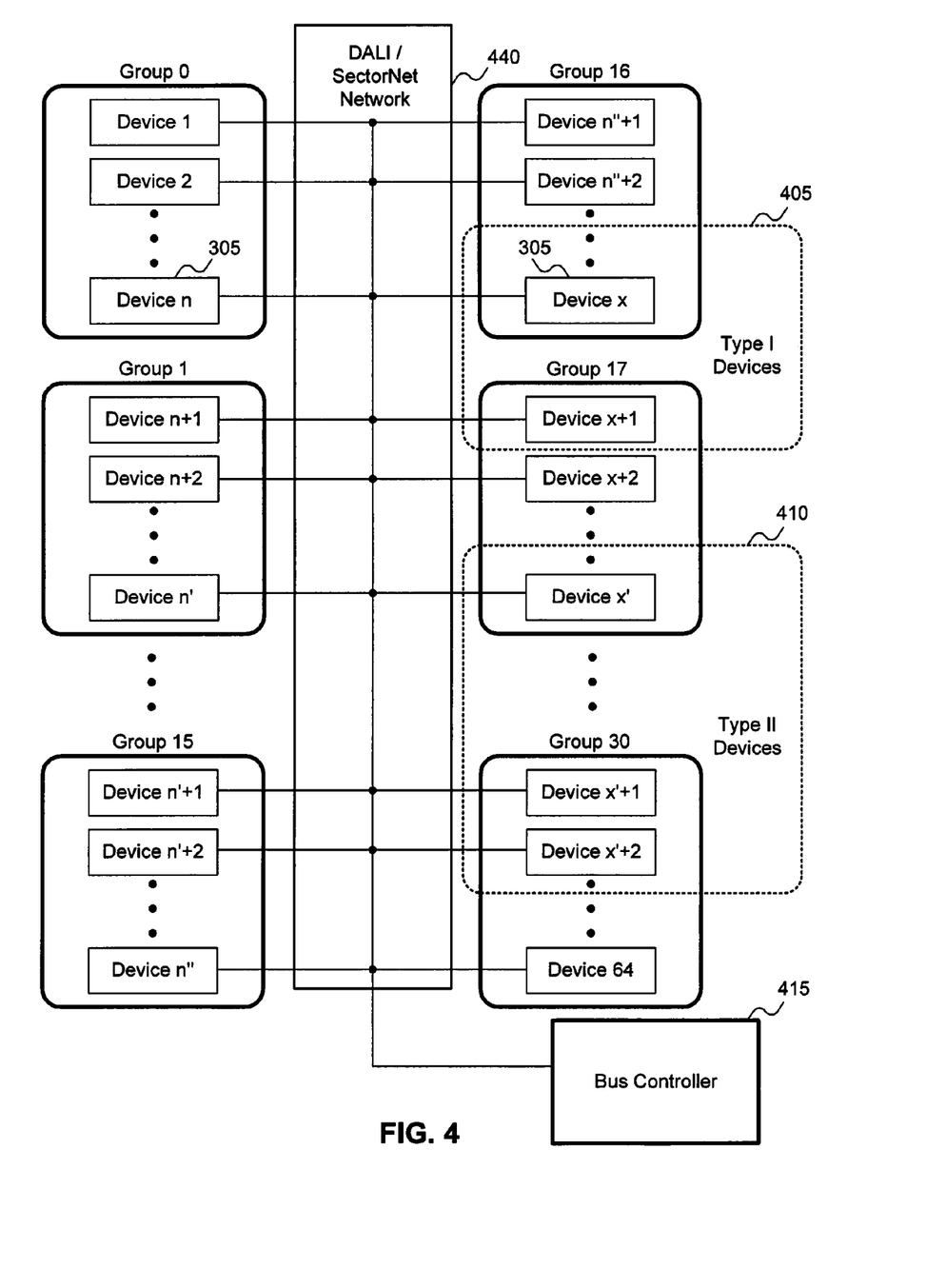
FIG. 4 illustrates an embodiment of an extended DALI network, according to some of the inventive principles of this patent disclosure.

FIG. 4 illustrates an embodiment of an extended DALI network 440 (including, for example, the SectorNet™ extensions), 64 devices (e.g., 305) arranged in 31 different groups (e.g., Groups 0-30), and 16 devices addressable by device type (e.g., 405 showing devices of Type I and 410 showing devices of Type II), according to some of the inventive principles of this patent disclosure. The devices (e.g., 305) may be ballasts or other types of devices such as occupancy sensors, switches, infrared sensors, or lamps, among other possibilities. For simplicity, the network connections of the extended DALI network 440 are shown as single lines. However, it will be appreciated by those with skill in the art that the devices can be controlled through a two-wire communication interface. A group of devices (e.g., Group 17) may include devices of different types (e.g., Group 17 contains devices of Type I and Type II), the devices of which may be simultaneously addressed by a transmitting node (e.g., bus controller 415), which designates a group address in a forward frame and transmits the forward frame from the transmitting node to each of a plurality of receiving nodes (e.g., a device 305) of the designated group.

In some embodiments, rather than transmitting a forward frame to a group containing multiple device types, the transmitting node may designate a device type address in the forward frame and transmit the forward frame from the transmitting node to any or all of a plurality of receiving nodes having that device type (e.g., Device x and Device x+1). For example, the transmitting node may transmit a forward frame to all ballasts on the network, thus excluding the forward frame from being processed by devices other than ballasts. The device type groups (e.g., Type I devices and Type II devices) may overlap one or more of the Groups 0-30. Furthermore, while FIG. 4 shows two device type groups, persons with skill in the art will recognize that more than two device type groups may be used, for example, preferably 16. A more detailed description of the device type addressing inventive principle is included in the descriptions below associated with FIGS. 7 and 8.

Figure 5:
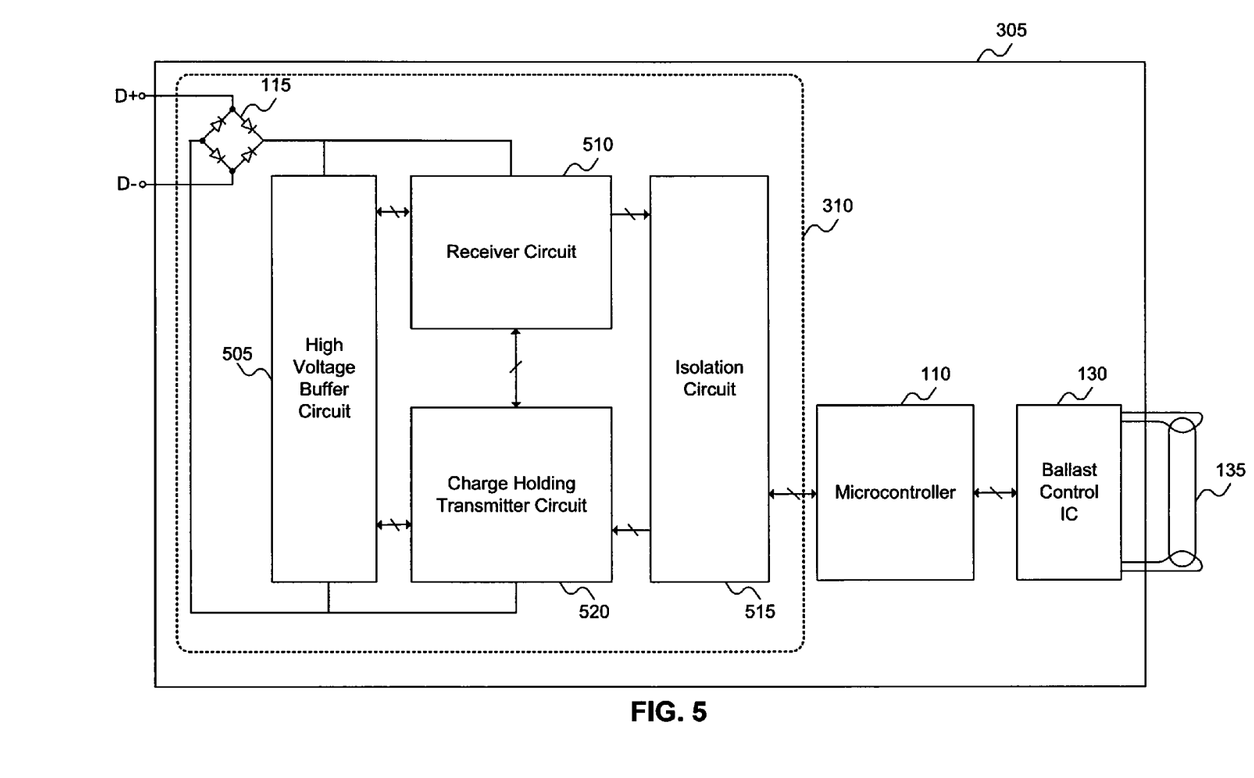
FIG. 5 illustrates an embodiment of the device of FIG. 3, including a high voltage buffer circuit, a receiver circuit, an isolation circuit, and a charge holding transmitter circuit, according to some of the inventive principles of this patent disclosure.

FIG. 5 illustrates an embodiment of the device of FIG. 3, including a high voltage buffer circuit 505, a receiver circuit 510, an isolation circuit 515, and a charge holding transmitter circuit 520, according to some of the inventive principles of this patent disclosure. The microcontroller 110 is structured to receive digital signals from network terminals D+ and D− via the interface circuit 310. The ballast control IC 130 is coupled to the microcontroller 110 and structured to control a device such as the lamp 135. The lamp 135 may preferably be a fluorescent lamp, although any other type of lamps may be used, such as incandescent or high intensity discharge. As previously mentioned, the device may be something other than a ballast, such as an occupancy sensor, a switch, a relay, or an infrared sensor, among other possibilities.

The interface circuit 310 is coupled between the network and the microcontroller 110, and includes the charge holding transmitter circuit 520, which is structured to store at least some energy from the network terminals D+ or D− while receiving the digital signals, and to transmit digital signals to the network using the stored energy. This inventive principle is more fully disclosed below with reference to FIG. 6.

The digital signals received from the network over terminals D+ and D− are received via bridge rectifier 115. The received digital signals include at least one forward frame. Similarly, the digital signals transmitted to the network over terminals D+ and D− are sent via bridge rectifier 115. And the transmitted digital signals may include at least one backward frame.

The receiver circuit 510 is structured to receive the digital signals (e.g., forward frames) from the network. The receiver circuit 510 may be coupled to the isolation circuit 515, the high voltage buffer circuit 505, and the charge holding transmitter circuit 520. These circuits may be designed to operate over a wide range of voltages, for example, between 9 V and 42 V.

The interface circuit 310 may include a high voltage buffer circuit 505 to withstand high voltages higher than the operating voltages of the forward and backward frames received and transmitted via the network, and to prevent the high voltages from causing damage to components of the interface circuit 310. Preferably, the high voltage buffer circuit 505 may be tolerant of 277 V RMS, or peaks of up to 450 V. This inventive principle is more fully disclosed below with respect to FIG. 6.

The isolation circuit 515 may be coupled between the receiver circuit 510 and the microcontroller 110, the isolation circuit 515 being structured to optically isolate the interface circuit 310 from the microcontroller 110. The isolation circuit 515 may protect other components of the device 305 (e.g., the microcontroller 110) from transient voltages or currents.

Figure 6:
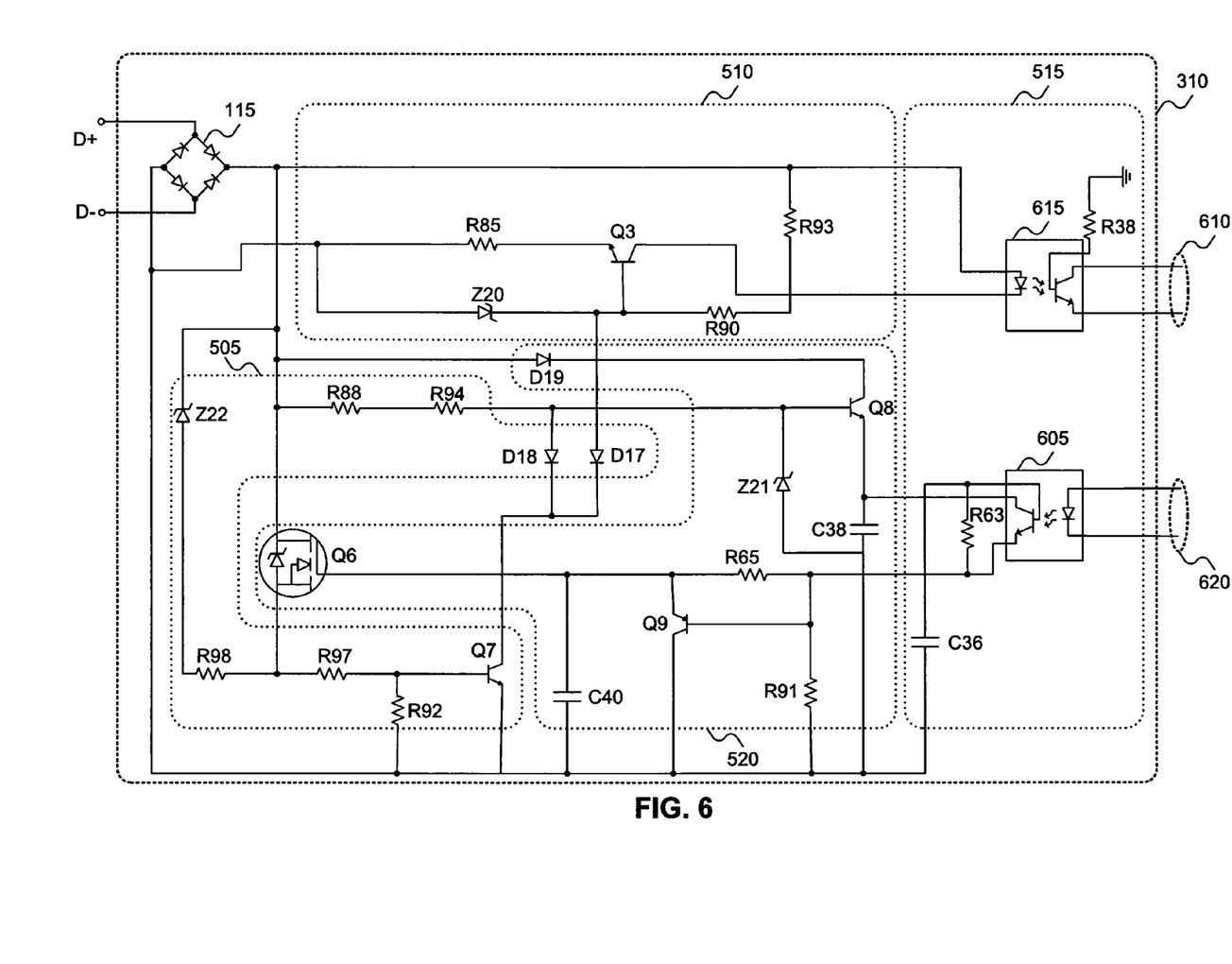
FIG. 6 illustrates an embodiment of the device of FIG. 5, including the high voltage buffer circuit, the receiver circuit, the isolation circuit, and the charge holding transmitter circuit, according to some of the inventive principles of this patent disclosure.

FIG. 6 illustrates an embodiment of the device of FIG. 5, including the high voltage buffer circuit 505, the receiver circuit 510, the isolation circuit 515, and the charge holding transmitter circuit 520, according to some of the inventive principles of this patent disclosure.

As previously mentioned, digital signals are transmitted and received to and from network terminals D+ and D− via the bridge rectifier 115. The charge holding transmitter circuit 520 may include a transmitting transistor Q6, which may be a metal oxide semiconductor field effect transistor (MOSFET). Persons with skill in the art will recognize that the transmitting transistor Q6 may be another type of transistor other than a MOSFET. Some of the benefits of using a FET type of transistor, however, include its low saturation voltage, high performance switching characteristics, and low power consumption, such that a charge can be maintained without drawing too much power, thereby enabling a more efficient transmission of signals even under low power conditions. A gate of the transmitting transistor Q6 is coupled to an emitter of the saturating optocoupler 605 of the isolation circuit 515.

The charge holding transmitter circuit 520 includes capacitor C38, which may store at least some of the energy from the network terminals D+ and/or D− in the form of a charge across the conductive plates of the capacitor C38 while receiving digital signals from the network terminals. During transmission of digital signals to the network, the power which was being received from the network while receiving the digital signals is cut off. Thus, the capacitor C38 may provide the needed charge to bias the gate of the transmitting transistor Q6. Further, the capacitor C40 may provide additional energy storage. The capacitor C38 is coupled to an emitter of an NPN-type BJT Q8. Persons having skill in the art will recognize that other types of transistors, other than a BJT, may be used. Diode D19 is coupled to a collector of the transistor Q8, and may serve as a steering diode such that the charge stored in the capacitors do not deplete prematurely. The transistor Q8 may serve as a buffer transistor, and may be controlled by the high voltage buffer circuit 505, as explained in more detail below. Like other circuit components of the interface circuit 310, the transistor Q8 is preferably rated to withstand up to 450 V peak or 277 V RMS. The collector of transistor Q8 is coupled to the cathode of the diode D19. The emitter of transistor Q8 is coupled to the capacitor C38 and to saturating optocoupler 605 of the isolation circuit 515. A zener diode Z21 is coupled in parallel with the capacitor C38, the zener diode Z21 being coupled to a base of the transistor Q8.

The charge holding transmitter circuit 520 may also include a PNP-type BJT Q9 coupled in parallel with resistor R91, the resistor R91 being coupled to the emitter of saturating optocoupler 605. The resistor R91 may serve as a pull down resistor for the saturating optocoupler 605. Resistor R65 may also be coupled to the emitter of the optocoupler 605. An emitter of the transistor Q9 is coupled to a gate of the transmitting transistor Q6. The transistor Q9 serves to accelerate the switching time by draining a gate capacitance of the transmitting transistor Q6. This allows the interface circuit 310 to operate at high voltages such as 40 V while maintaining or enhancing the performance of the network. Furthermore, the slew rate of the transmitted signals is reduced.

The isolation circuit 515 may include saturating optocouplers 615 and 605. Unlike the conventional interface circuit shown in FIG. 1, saturating optocouplers used in the isolation circuit 515 may include an additional terminal coupled to the base of the BJT of the optocoupler, the terminal being coupled to a resistor (e.g., R38 or R63) to achieve substantially a 50% even duty cycle. Otherwise, an unwanted charge builds on the base of the BJT of the optocoupler, which substantially slows the switching speed of the optocoupler. The terminal coupled to the base of the BJT of the saturating optocoupler 605 is coupled to resistor R63, which is coupled to the gate of the transmitting transistor Q6. A capacitor C36 is also coupled to the base of the BJT of the saturating optocoupler 605. The terminal coupled to the base of the BJT of the saturating optocoupler 615 is coupled to resistor R38, which may be coupled to ground. The signals 610 may be 5V signals transmitted from the isolation circuit 515 of the interface circuit 310 to the microcontroller 110 (of FIG. 5). Similarly, the signals 620 may be 5V signals transmitted from the microcontroller 110 (of FIG. 5) to the isolation circuit 515 of the interface circuit 310.

The high voltage buffer circuit 505 may include a voltage transient protection transistor Q7, which may be coupled to resistors R92, R97, R98 and zener diode Z22. The transistor Q7 may be an NPN-type BJT. A base of the transistor Q7 is coupled to the zener diode Z22. Upon reaching a predefined voltage, the transistor Q7 is saturated, which in turn disables transistors Q3 and Q8 such that voltage transients are prevented from damaging circuit components of the interface circuit 310. A collector of the transistor Q7 is coupled to the base of transistor Q3 via diode D17. The collector of the transistor Q7 is also coupled to the base of transistor Q8 via diode D18. As a result, the voltage transient protection transistor Q7 turns off transistors Q3 and Q8 responsive to high voltages higher than normal operating voltages associated with the forward and backward frames transmitted and received to and from the network. Resistors R88 and R94 are coupled to the base of transistor Q8, and like other circuit components of the interface circuit 310, are designed to handle 277 V RMS, or peaks of up to 450 V.

The receiver circuit 510 may be structured to receive digital signals from the network. The receiver circuit 510 may include an NPN-type BJT Q3, which may be a current limiter or current source. This enables the receiver circuit 510 to operate over a wide range of voltages, for example, between 9 V and 42 V, while substantially maintaining a constant current. The transistor Q3 may be coupled to zener diode Z20 and resistors R85, R90, and R93, and may limit the current to about 2 mA.

Figure 7:
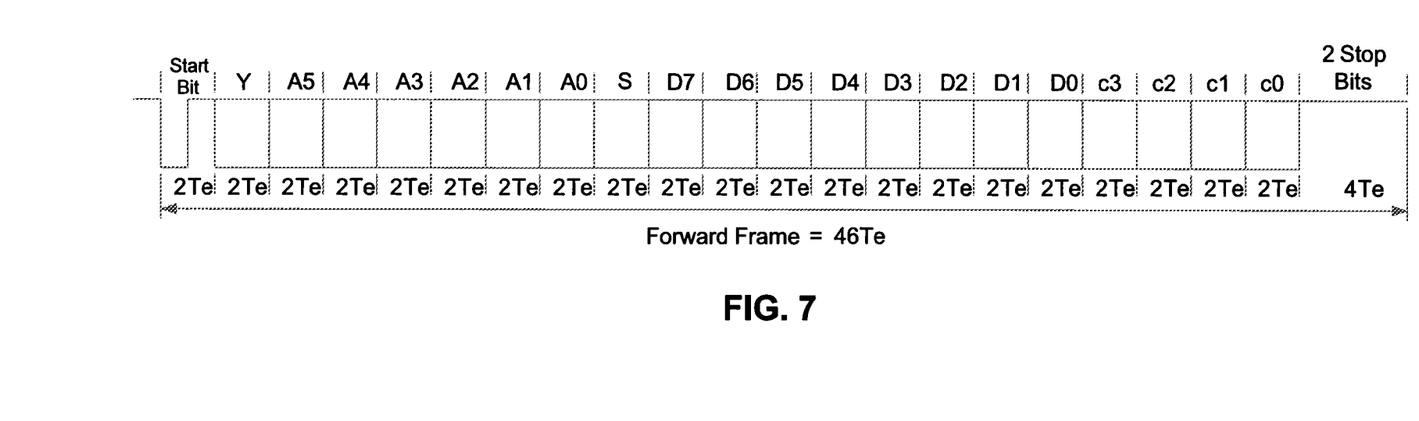
FIG. 7 illustrates an embodiment of a forward frame according to some of the inventive principles of this patent disclosure.

FIG. 7 illustrates an embodiment of a forward frame according to some of the inventive principles of this patent disclosure. A forward frame may be a sequence of bits used to transmit data from a master or transmitting node (e.g., Bus Controller 415 of FIG. 4) to a slave/remote or receiving node (e.g., Device 305 of FIG. 4). Referring to FIG. 7, the frame may be 23 bits long and may begin with a start bit followed by 8 address bits (e.g., Y, A5, A4, A3, A2, A1, and A0), 8 payload bits (e.g., D7-D0), 4 CRC bits (e.g., error check code c3-c0), and finally 2 stop bits. Although not shown in FIG. 7, the 8 address bits may be represented or constructed in various embodiments, each of the embodiments having different bit arrangements. For example, some embodiments may include bits YAAA AAAS. This bit arrangement may be used with both a conventional and an extended DALI network addressing scheme. For example, when bit Y is a zero, address bits AAAAAA may be used to address up to 64 individual devices (e.g., 305). When bit Y is a one, a group address, device type group address, or broadcast address may be indicated.

In some embodiments, the device 305 may be operated on either a conventional or an extended DALI network. If operating on a conventional DALI network, a group address may be indicated by bits 100G GGGS. Group bits GGGG may be used to address up to 16 groups (e.g., Groups 0-15). On the other hand, if operating on an extended DALI network, a group address may be indicated by bits 11GG GGGS. Here, the first and second bits are both ones, which may indicate an extended group address. Group bits GGGGG may be used to address up to 31 groups (e.g., Groups 0-30). In some embodiments, bit S may correspond to a packet selector bit. For example, when bit S is a zero, a data byte XXXX XXXX following the address byte may indicate a direct dimmer power level. When bit S is a one, the data byte following the address byte may indicate a command.

Additionally, if operating on an extended DALI network, groups of devices having a same device type may be addressed at substantially the same time. For instance, an address byte may include bits 100D DDDS to indicate that a group of devices having a same device type should be addressed (e.g., device x and device x+1 having a same device Type I, as illustrated in FIG. 4). The device types may be indicated by the DDDD bits. In other words, device type bits DDDD may be used to address up to 16 groups, each group having devices of the same type. As such, a forward frame can be sent, for example, to all ballasts on an extended DALI network, thus excluding the forward frame from being processed by devices other than ballasts.

The bits of the frame may be arranged as any suitable combination or number of addresses, data, selector bits, and so on. Similarly, other frame sizes may be used. The CRC error check code may preferably be 4 bits, but can also be 6 or 8 bits, among other possibilities. The CRC error check code preferably covers both address and data payload bits. All bits may be transmitted or received using an edge-sensitive protocol. For example, biphase coding may be used, which may ensure that there is at least one transition between each address or data bit. Specifically, using biphase coding may include defining each logical 1 to be represented as two different bits (10 or 01), the two different bits comprising a cell. Conversely, a logical 0 may be represented as two equal bits (00 or 11), the two equal bits comprising another cell. Every logical level at the start of a cell may be an inversion of the level at the end of the previous cell. Furthermore, the stop bits may be implemented as an idle line condition.

Figure 8:
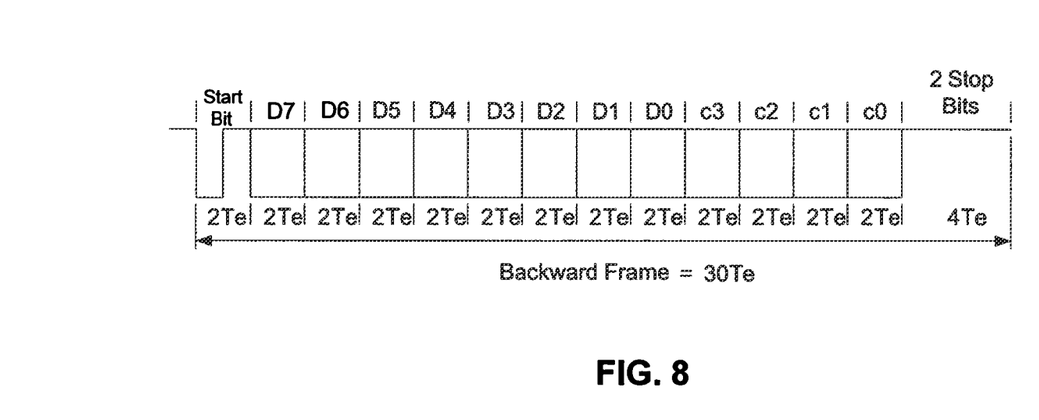
FIG. 8 illustrates an embodiment of a backward frame according to some of the inventive principles of this patent disclosure.

FIG. 8 illustrates an embodiment of a backward frame according to some of the inventive principles of this patent disclosure. A backward frame may be a sequence of bits used to return data from the slave/remote or receiving node (e.g., Device 305 of FIG. 4) to the master or transmitting node (e.g., Bus Controller 415 of FIG. 4). Referring to FIG. 8, the frame may be 15 bits long and may begin with a start bit followed by 8 payload bits (e.g., D7-D0), 4 CRC bits (error check code c3-c0), and finally 2 stop bits. However, the bits of the frame may be arranged as any suitable combination or number of addresses, data, selector bits, and so on. Similarly, other frame sizes may be used. The CRC error check code may preferably be 4 bits, but can also be 6 or 8 bits, among other possibilities. The CRC error check code preferably covers both address and data payload bits. Furthermore, the stop bits may be implemented as an idle line condition.

Figure 9:
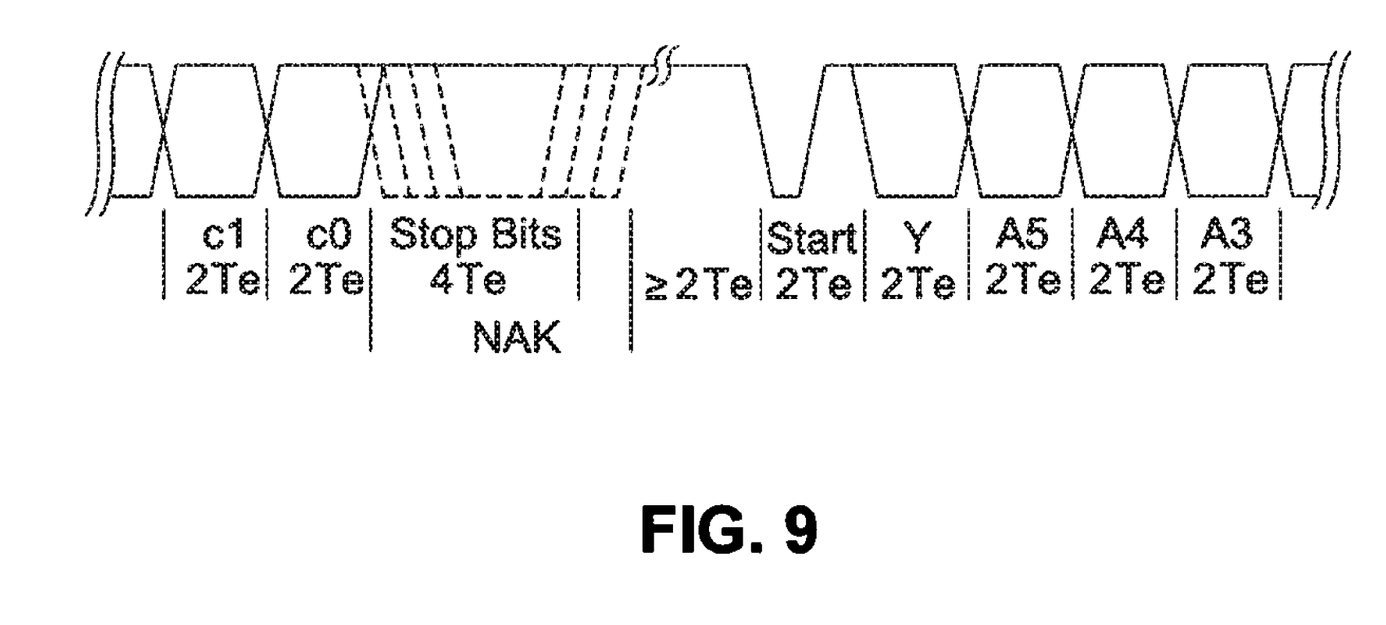
FIG. 9 illustrates an embodiment of a technique for enabling a device to signal that an error exists in a frame according to some of the inventive principles of this patent disclosure.

FIG. 9 illustrates an embodiment of a technique for transmitting and receiving a frame according to some of the inventive principles of this patent disclosure. FIG. 9 illustrates the end of one frame and the beginning of the next frame. During the stop bits of the first frame, a receiving node may signal that an error exists in the payload by asserting a dominate bit (no-acknowledgment, or NAK pulse) on the data line during the 2 stop bit time period. This may indicate to the transmitting node that at least one receiver did not receive the message properly. The transmitting node may retransmit the frame responsive to the NAK pulse. In some embodiments, the transmitting node may retransmit the frame responsive to a timeout. Preferably, the transmitting node will attempt to retry up to 3 times, after which an error message may be sent to an operator of the network. A person with skill in the art will recognize that a different number of retry attempts may be performed. If a receiving node issues NAK pulses more than a threshold number of times, the receiving node may automatically disable itself from the network or be requested to cease participating in network communications for a period of time. Note that the stop bits appearing at the end of the first frame bear the notation "≧2Te." This indicates that an embodiment may be configured to operate with more than two stop bits. For example, in one system, all communicating devices allow the bus to remain idle for 6 bit periods.

Figure 10:
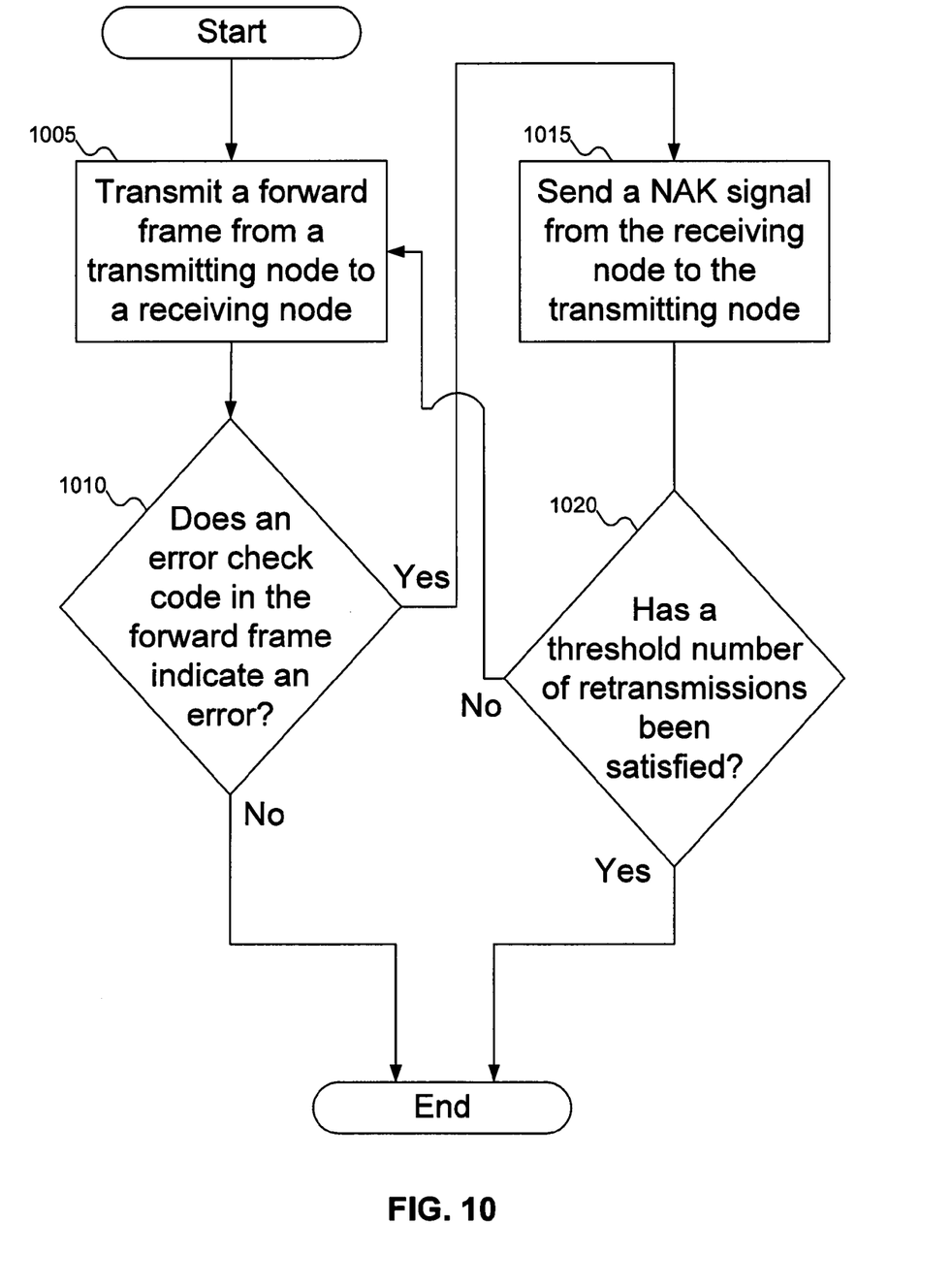
FIG. 10 is a flow diagram illustrating an embodiment of a technique for enabling a device to signal that an error exists in a frame according to some of the inventive principles of this patent disclosure.

FIG. 10 is a flow diagram illustrating an embodiment of a technique for enabling a device to signal that an error exists in a frame according to some of the inventive principles of this patent disclosure. At step 1005, a forward frame may be transmitted from a transmitting node to a receiving node. At step 1010, an error check code in the forward frame may be examined to see whether an error exists in the transmission. If an error exists, a NAK signal may be sent from the receiving node to the transmitting node, as indicated at step 1015. After the NAK is sent by the receiving node, the transmitting node may determine whether a threshold number of retransmissions (e.g., 3) is satisfied, as set forth at step 1020. If the threshold number of retransmissions has not been satisfied, a retransmission of the forward frame may occur at step 1005.

In some embodiments, devices may transmit data on the bus by momentarily shorting the buss of the network to indicate a dominant bit, thus causing a voltage fluctuation. Devices may receive data by monitoring for voltage fluctuations. Thus, in the NAK scheme described above, more than one receiving or listening node may signal NAK pulses at the same time responsive to a message broadcast to multiple receivers. The transmitting node may have built-in tolerances to handle differentials between the timing of the NAK pulses from the multiple receiving nodes. The NAK signaling technique may also be utilized with backward frames.

Figure 11:
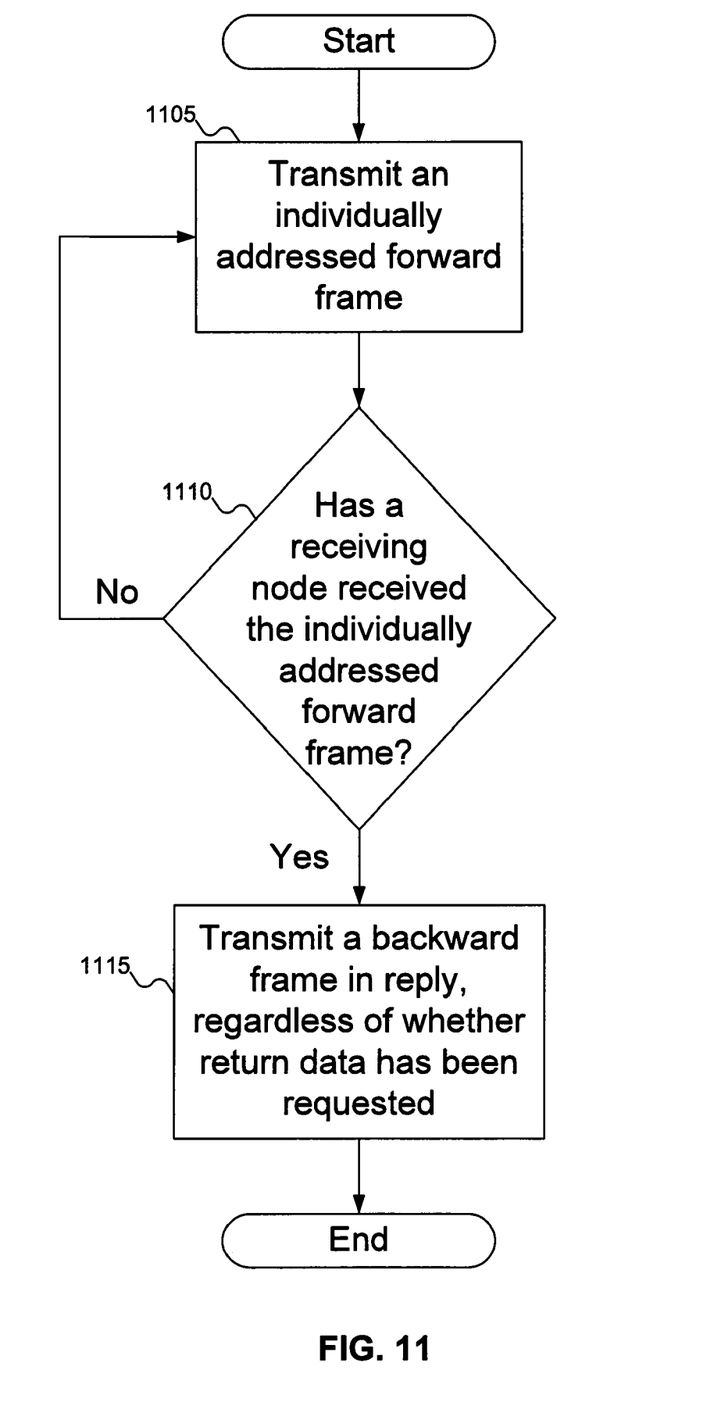
FIG. 11 is a flow diagram illustrating an embodiment of a technique for providing an additional measure of reliable communications, according to some of the inventive principles of this patent disclosure.

FIG. 11 is a flow diagram illustrating an embodiment of a technique for providing an additional measure of reliable communications, according to some of the inventive principles of this patent disclosure.

As an additional measure to insure reliable communications, some embodiments may have a receiving node (e.g., 305 of FIG. 4) that has received an individually addressed forward frame to always transmit a backward frame in reply, regardless of whether return data has been requested. This reply may be the actual requested data or may simply be any valid response, for example, 0xFF. This may confirm the receipt of an error-free forward frame. This action will confirm the receipt of all individually addressed forward frames. For example, at step 1105 of FIG. 11, an individually addressed forward frame may be transmitted by a transmitting node. At step 1110, a determination is made whether a receiving node has received the individually addressed forward frame. If the receiving node has received the individually addressed forward frame, the receiving node transmits a backward frame at step 1115, regardless of whether return data has been requested by the transmitting node.

The embodiments described above may be implemented in various forms in accordance with the inventive principles of the present disclosure. For example, some inventive principles are not limited to a DALI network, but could be implemented with any lighting control network. Since the embodiments described above can be modified in arrangement and detail without departing from the inventive concepts, such changes and modifications are considered to fall within the scope of the following claims.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals)), etc.

The applications of the present invention have been described largely by reference to specific examples and in terms of particular allocations of functionality to certain hardware and/or software components. However, those of skill in the art will recognize that a lighting control protocol consistent with the scope of the present invention can also be implemented by software and hardware that distribute the functions of embodiments of this invention differently than herein described. Such variations and implementations are understood to be captured according to the following claims.

We claim:

1. A method comprising:

receiving a forward frame transmitted by a transmitter via a lighting control network that utilizes a two-wire connection and bi-phase coding, the forward frame including a start bit, an address byte, a data byte, one or more stop bits, and an error check code to detect an error other than a frame format error in the received forward frame; and altering a state of an electrical load in response to the received frame if the error check code indicates no error in the received forward frame.

2. The method of claim 1, further comprising:
transmitting a no-acknowledgement ("NAK") signal to the transmitter via the two-wire connection if the error check code indicates an error in the received frame.

3. The method of claim 2, further comprising:
accumulating energy from a potential difference between a first wire of the two-wire interface and a second wire of the two-wire interface; and
using part of the accumulated energy to transmit the NAK signal.

4. The method of claim 1, wherein altering the state of the electrical load includes at least one of turning a lighting fixture on, turning a lighting fixture off, increasing a brightness of a lighting fixture, or decreasing the brightness of a lighting fixture.

5. The method of claim 1, further comprising:
receiving a backward frame via the two-wire connection, the backward frame including the error check code to detect an error in the received backward frame.

6. The method of claim 5, wherein receiving the backward frame includes:
receiving the backward frame in reply to the forward frame to confirm receipt of an error-free forward frame.

7. The method of claim 1, wherein the error check code comprises a cyclic redundancy check (CRC) code.

8. The method of claim 1, wherein the error check code comprises one of a 4-bit, a 6-bit, and an 8-bit CRC code.

9. A method comprising:
receiving a forward frame transmitted by a transmitter via a two-wire connection, the forward frame including error check information to detect an error in the received forward frame; and
altering a state of an electrical load in response to the received frame if the error check information indicates no error in the received forward frame;
wherein receiving comprises:
decoding a biphase bit signal presented on the two-wire connection, wherein a first bit value is represented by a potential difference of 0V±6.5V between a first wire and a second wire of the two-wire interface, and a second bit value is represented by a potential difference of 9.5V to 42V between the first wire and the second wire of the two-wire interface.

10. The method of claim 9 wherein a bit rate of the biphase bit signal is significantly faster than 1,200 bits per second.

11. The method of claim 9 wherein:
the forward frame is transmitted via a lighting control network that utilizes the two wire connection and bi-phase coding; and
the forward frame includes a start bit, an address byte, a data byte, one or more stop bits.

12. A method of signaling on a digital lighting control network comprising:
transmitting a forward frame from a transmitting node to a receiving node on the digital lighting control network via a two-wire connection using bi-phase encoding, wherein the forward frame includes a start bit, an address byte, a data byte, one or more stop bits, and an error check code to detect an error other than a frame format error in the forward frame; and
sending a no-acknowledgment (NAK) signal from the receiving node to the transmitting node responsive to detecting an error other than a frame format error in the forward frame.

13. The method of claim 12, wherein sending the NAK signal comprises asserting the NAK signal during at least one stop bit of the forward frame.

14. The method of claim 13, wherein the at least one stop bit comprises an idle state, the NAK signal comprises a dominant bit, and the transmission is edge-sensitive.

* * * * *